US009915944B2

(12) United States Patent
Viswanathan et al.

(10) Patent No.: US 9,915,944 B2
(45) Date of Patent: Mar. 13, 2018

(54) IN-LINE ANALYZER FOR WAVELET BASED DEFECT SCANNING

(75) Inventors: Mathuranathan Viswanathan, Singapore (SG); Myint Ngwe, Singapore (SG); Quek Leong Choo, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 688 days.

(21) Appl. No.: 13/211,968

(22) Filed: Aug. 17, 2011

(65) Prior Publication Data
US 2013/0046491 A1    Feb. 21, 2013

(51) Int. Cl.
*G05B 23/02*    (2006.01)
*G11B 27/36*    (2006.01)

(52) U.S. Cl.
CPC .......... *G05B 23/0224* (2013.01); *G11B 27/36* (2013.01)

(58) Field of Classification Search
CPC .................................................... G06F 17/148
See application file for complete search history.

(56) References Cited

U.S. PATENT DOCUMENTS

| | | | |
|---|---|---|---|
| 5,497,777 A * | 3/1996 | Abdel-Malek et al. | 600/443 |
| 5,815,198 A | 9/1998 | Vachtsevanos et al. | |
| 6,647,252 B2 * | 11/2003 | Smith | G06F 17/148 375/350 |
| 6,728,645 B1 * | 4/2004 | Kozlov et al. | 702/56 |
| 6,804,381 B2 | 10/2004 | Pang et al. | |
| 7,519,222 B2 | 4/2009 | Kisilev et al. | |
| 7,773,774 B2 | 8/2010 | Rasmussen et al. | |
| 8,014,094 B1 * | 9/2011 | Jin | G11B 20/182 360/31 |
| 2005/0188278 A1 * | 8/2005 | Zimmer | G06F 11/106 714/42 |
| 2010/0182158 A1 * | 7/2010 | Borghetti et al. | 340/669 |
| 2012/0033535 A1 * | 2/2012 | Shiozawa et al. | 369/30.1 |
| 2012/0136619 A1 * | 5/2012 | Huang | B60R 21/0132 702/141 |
| 2014/0013847 A1 * | 1/2014 | Decoux | G04D 7/001 73/579 |

OTHER PUBLICATIONS

Wikipedia, Time-frequency representation, Jun. 4, 2009.*

* cited by examiner

*Primary Examiner* — Kyle R Quigley
(74) *Attorney, Agent, or Firm* — Holzer Patel Drennan

(57) ABSTRACT

A method and system for providing simultaneous localization of defects in both the time and frequency domain. A high frequency repeating pattern is written on media, and the pattern is read to generate a readback signal, which is converted into ADC samples. The ADC samples are analyzed, in-line, to determine the type of wavelet, level of decomposition, and threshold level for a wavelet transform of the particular readback signal. The wavelet transform provides details and/or approximations (wavelet coefficients) that are analyzed to determine the type, location, and duration of any identified defects. Any noise in the details and/or approximations (wavelet coefficients) is removed by a wavelet based denoising operation. Flags indicating the type, location, and duration of any defects are generated so that the defects may be mapped.

20 Claims, 5 Drawing Sheets

IN-LINE ANALYZER FOR WAVELET BASED DEFECT SCANNING

SUMMARY

Implementations described and claimed herein provide simultaneous localization of defects in both the time and frequency domain. In one implementation, a wavelet based defect scan is integrated into a read channel of a storage device. A high frequency repeating pattern is written on a test track in media in the storage device, and the pattern is read to generate a readback signal. The read channel outputs Analog to Digital Converter (ADC) samples from the readback signal. An ADC samples analyzer analyzes the ADC samples, in-line, to determine the type of wavelet, level of decomposition, and threshold level required to categorize defects for the particular readback signal. A wavelet transform is applied to the ADC samples based on the output of the ADC samples analyzer. The wavelet transform provides details and/or approximations (wavelet coefficients) that are analyzed by a wavelet coefficient analyzer to determine the type, location, and duration of any identified defect. The wavelet coefficient analyzer generates a flag indicating the type, location, and duration of any identified defect so that the defect may be mapped.

These and various other features and advantages will be apparent from a reading of the following detailed description.

BRIEF DESCRIPTIONS OF THE DRAWINGS

DETAILED DESCRIPTIONS

Defects on storage device media can cause uncorrectable errors. Such storage devices may include, without limitation, hard disc drives (HDD), solid-state drives (SSD), optical drives, magnetic drives, and network attached drives. Defects in storage device media may be identified with Error Correction Coding (ECC), which utilizes an algorithm for expressing a sequence of numbers such that any errors that are introduced can be detected and corrected based on the remaining numbers. However, long bursts of defects on storage device media may be too large for ECC schemes to correct. Further, defective locations in the media should be mapped to prevent data from being written onto these locations.

Defective locations in storage device media may be mapped by writing a high frequency repeating pattern on the entire media and reading back each sector in either the time or frequency domain to check for unusual changes in the readback signal amplitude or frequency. Time domain analysis provides information regarding the amplitude changes of the readback signal and the duration of a defect based on some thresholds. However, time domain analysis may not provide a clear picture of the defect when the defect is manifested in the form of frequency changes. On the other hand, frequency domain analysis provides information regarding the frequency components of the readback signal but cannot provide information about the duration of the defect. Thus, reading back each sector in either the time domain or frequency domain does not provide sufficient insight into the nature of the defects present in the media to accurately identify the length, location, and type of defect. Further, if the readback signal contains spurious noises, erroneous decisions regarding any identified defect may occur. Accordingly, the presently disclosed technology provides simultaneous localization of defects in both the time and frequency domains by using in-line analysis for wavelet-based defect scanning. To perform in-line analysis for wavelet based defect scanning, a wavelet transform is applied to signal samples based on defined parameters with the parameters being defined based on the signal samples.

Figure 1:
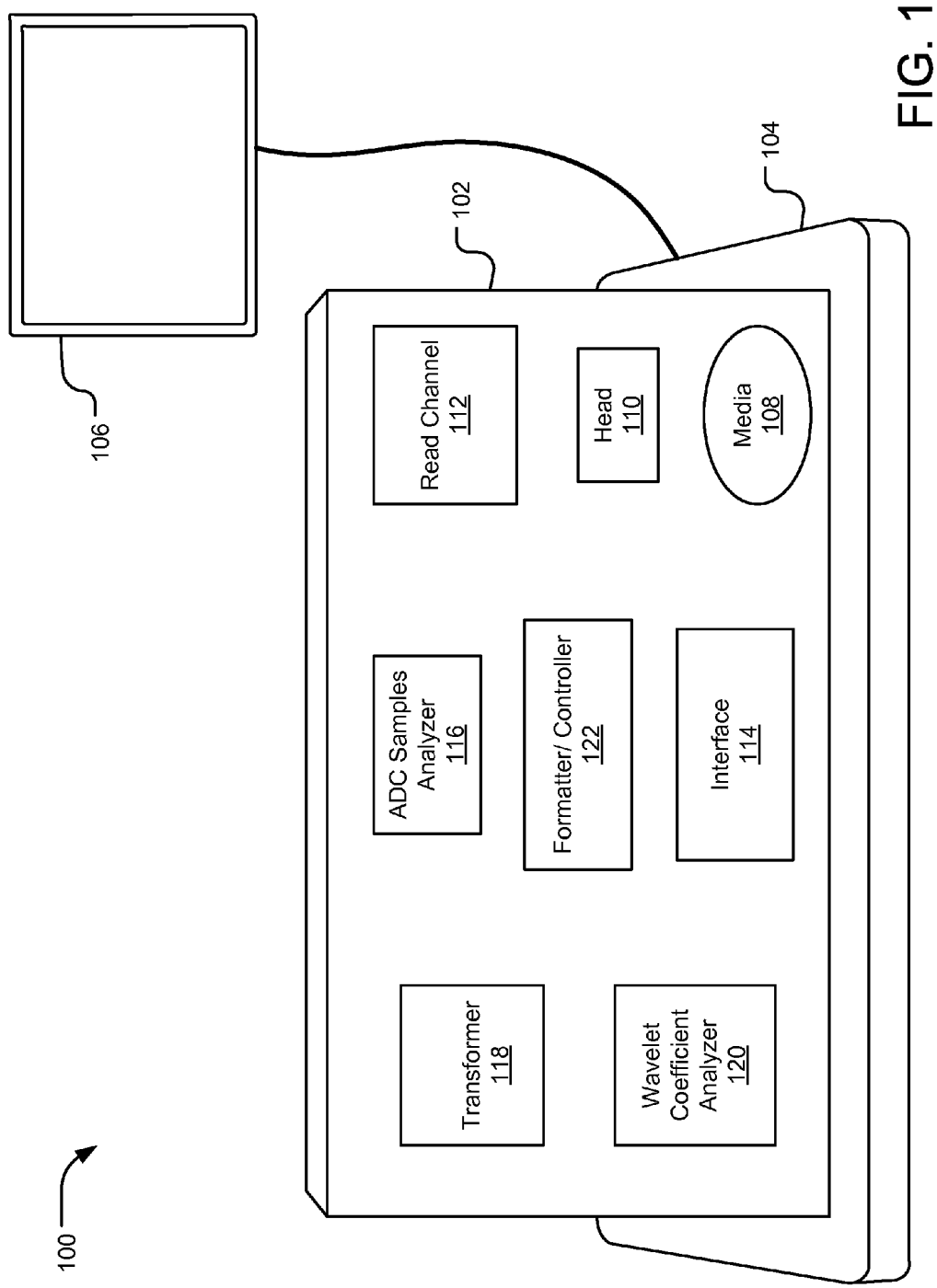
FIG. 1 illustrates an example testing system for identifying and mapping defects.

FIG. 1 illustrates an example testing system 100 for identifying and mapping defects. An implementation of the testing system 100 includes a storage device 102 that is connected to a test fixture 104. The test fixture 104 is operatively coupled to a computing system 106 during the certification process to detect the presence of defects on media 108 in the storage device 102. The computing system 106 may be implemented as various devices configured to communicate with the storage device 102, including without limitation a general purpose computer or special purpose computing device.

The computing system 106 sends an instruction to the storage device 102 to begin scanning for defects in the media 108. The media 108 may embody, without limitation, magnetic, optical, solid state, electrical, mechanical, and/or other data storage. The media 108 has one or more tracks. Each track in the media 108 includes read data sectors and servo data sectors. The servo data sectors store information to control the position of a head 110 over a track to retrieve stored information in a read sector.

A read channel 112 in the storage device 102 receives the instruction from the computing system 106 to begin scanning for defects in the media 108 via an interface 114. The read channel 112 may be, for example, an integrated circuit that encodes, detects, and decodes data to control the head 110 to write data to the media 108 and read back the data on the media 108. To begin scanning for defects, the read channel 112 controls the head 110 to write a high frequency repeating pattern, such as a 2T or 4T pattern, to a test sector in the media 108, to a test track in the media 108, or to the entire media 108. The read channel 112 controls the head 110 to read back the test track to generate a readback signal. The readback signal may be amplified prior to being processed by the read channel 112.

The read channel 112 performs equalization or filtering operations on the amplified readback signal to filter noise from the head 110 and the media 108 in the analog domain of the readback signal. Additionally, the read channel 112 includes an Analog to Digital Converter (ADC). The filtered readback signal is converted into ADC samples at the read channel 112 analog front end. The ADC samples are outputted into an ADC samples analyzer 116 and a transformer 118. The ADC samples analyzer 116 may be, for example, an integrated circuit or logic configured to analyze the ADC samples to tune a wavelet transform on the ADC samples to maximize defect detection. The transformer 118 may be, for example, an integrated circuit or logic configured to apply a wavelet transform to a signal, such as the ADC samples.

The transformer 118 applies a wavelet transform to the ADC samples based on the output of the ADC samples analyzer 116. The ADC samples analyzer 116 tunes the wavelet transform to be performed by the transformer 118 to improve the performance and accuracy of the wavelet based defect scanning for the particular readback signal. The ADC samples analyzer 116 determines the type of wavelet, level of decomposition, and threshold level required to identify and categorize defects for the particular readback signal based on the entropy of the ADC samples. The type of wavelet may include Daubechies, Coiflets, Symlets, Discrete Meyer, Mortlet, etc., or a wavelet constructed to meet the needs of the particular readback signal.

The transformer 118 applies a wavelet transform to the ADC samples outputted from the read channel 112 using the type of wavelet, level of decomposition, and threshold level determined by the ADC samples analyzer 116. The wavelet transform by the transformer 118 provides a clear manifestation of the readback signal simultaneously in both the time and frequency domains. The wavelet transform to obtain the time-frequency representation may be a continuous wavelet transform (CWT) or a discrete wavelet transform (DWT). With respect to the CWT and DWT, the time-frequency representation is obtained by time-scaling and time-shifting (translating) a mother wavelet that is determined based on the results of the ADC samples analyzer 116.

In DWT, the time-scale representation of the ADC samples is obtained through digital filtering techniques. The DWT decomposes the ADC samples into wavelet coefficients or details and/or approximations (wavelet coefficients) to analyze the ADC samples at different frequency bands with different resolutions, and the shape of wavelets, which are defined in terms of the mother wavelet, are determined by the coefficients of reconstruction filters. The DWT utilizes scaling functions associated with a low-pass decomposition filter and wavelet functions associated with a high-pass decomposition filter. The low-pass and high-pass decomposition filters, together with their associated reconstruction filters, form a Quadrature Mirror Filters (QMF) system. The successive filtering of the ADC samples through high-pass and low-pass stages decomposes the ADC samples into different frequency bands. Based on the Nyquist Sampling Theorem, once the ADC samples have a highest frequency of $\pi/2$ radians instead of $\pi$, half of the details and/or approximations (wavelet coefficients) obtained after each decomposition filtering stage may be discarded using, for example, a decimator. This decomposition stage halves the time resolution and doubles the frequency resolution. Thus, the relationship between the high-pass and low-pass decomposition filters at this stage means that approximate perfect reconstruction of the ADC samples is possible. The successive filtering of the ADC samples signal through the high-pass and low-pass decomposition filtering stages may be repeated for further decomposition levels, as determined by the ADC samples analyzer 116. Additionally, Fast Wavelet Transforms may be used to reduce the computational complexity and computation time of the DWT. At each decomposition level, the ADC samples are decomposed into details and/or approximations (wavelet coefficients), which may be analyzed to identify defects in the media 108.

A wavelet coefficients analyzer 120 analyzes the details and/or approximations (wavelet coefficients) at the various decomposition levels obtained after the transformer 118 applies the wavelet transform to the ADC samples. Based on the analysis of the details and/or approximations (wavelet coefficients), the wavelet coefficients analyzer 120 detects defects in the media 108. However, the presence of spurious noise may cause incorrect identification of defects. Therefore, the wavelet coefficients analyzer 120 differentiates between true defects and noise. For example, if the analysis of the details and/or approximations (wavelet coefficients) at a given decomposition level show two spikes in the waveform that are above the threshold level determined by the ADC samples analyzer 116, the details and/or approximations (wavelet coefficients) between the two spikes correspond to a defect rather than noise.

There are various types of defects that may be present in the readback waveform of the details and/or approximations (wavelet coefficients), such as drop-out defects, drop-in defects, and erasure defects. Drop-out, drop-in, and erasure defects of any length and amplitude may be identified accurately. To identify the location, length, and type of defect, the energy, entropy, and frequency content of the details and/or approximations (wavelet coefficients) are analyzed.

After identifying the nature of any defects in the media 108, the wavelet coefficients analyzer 120 generates flags or status signals indicating the type, location, and length of each defect. The wavelet coefficients analyzer 120 sends the flags to a formatter/controller 122, so the formatter/controller 122 may take appropriate action to map the defect location. The formatter/controller 122 matches the defect locations to a memory buffer to prevent data from being recorded in the locations in the media 108 where a defect is present. Each sector in the media 108 is tested for defects, and if a defect is found in a particular sector, the formatter/controller 122 receives a flag from the wavelet coefficients analyzer 120 indicating the nature of the defect. The formatter/controller 122 records the defect and automatically disqualifies adjacent sectors to create a buffer around the defect and to ensure the adjacent sectors are not impacted by the defect.

Figure 2:
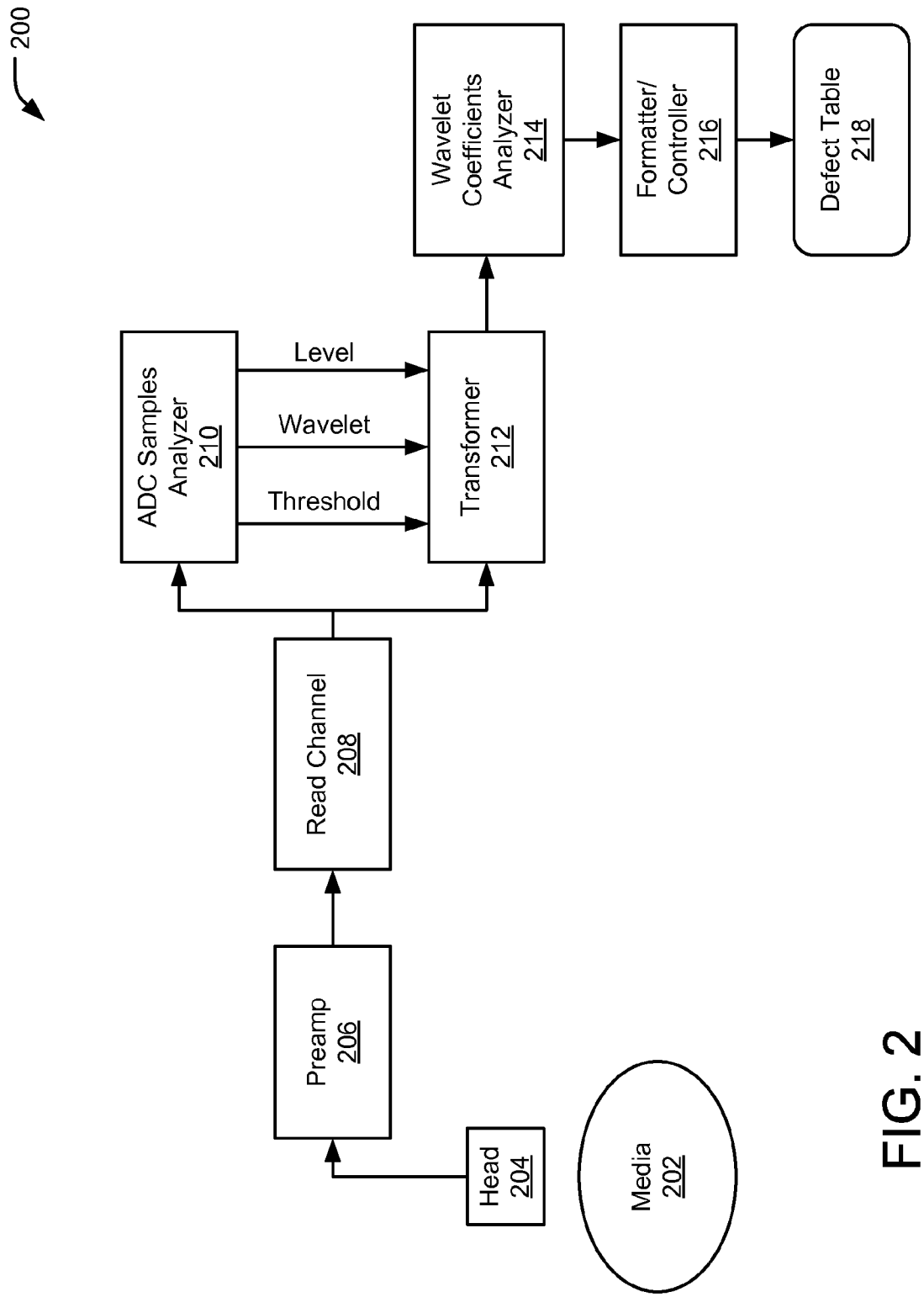
FIG. 2 illustrates an example scanning system providing in-line analysis for wavelet-based defect scanning.

FIG. 2 illustrates an example scanning system 200 providing in-line analysis for wavelet-based defect scanning. To scan for defects in media 202, a head 204 writes a high frequency repeating pattern on a test sector or on a test track or on the entirety of the media 202. The head 204 reads the signal from the media 202 generating a readback signal embedded with the high frequency repeating pattern. The readback signal is input into a preamp 206 to sufficiently amplify the readback signal for analysis. The preamp 206 outputs the amplified readback signal into a read channel 208. The read channel 208 removes noise from the head 204 and the media 202 by filtering the analog domain of the amplified readback signal. The read channel 208 converts the amplified readback signal into ADC samples.

The ADC samples are input into an ADC samples analyzer 210 and a transformer 212. The ADC samples analyzer 210 passes the ADC samples through each type of wavelet, for example Daubechies, Coiflets, Symlets, Mortlet, etc., and detects the entropy of the ADC samples. Based on the entropy of the ADC samples, the decomposition levels, threshold, and wavelet type required to accurately categorize any defects present in the media 202 can be determined. As such, the ADC samples analyzer 210 determines a wavelet type, threshold, and decomposition levels that is unique to the ADC samples. The transformer 212 applies a wavelet transform to the ADC samples based on the results of the ADC samples analyzer 210. The transformer 212 decomposes the ADC samples into details and/or approximations (wavelet coefficients) according to the decomposition levels and the wavelet type determined by the ADC samples analyzer 210.

The details and/or approximations (wavelet coefficients) obtained from the transformer 212 are input into a wavelet coefficients analyzer 214 for detection of defects. The wavelet coefficients analyzer 214 analyzes the details and/or approximations (wavelet coefficients) based on the parameters determined by the ADC samples analyzer 210. The wavelet coefficients analyzer 214 analyzes the details and/or approximations (wavelet coefficients) at a given decomposition level to determine if the waveform of the details and/or approximations (wavelet coefficients) is outside the threshold level determined by the ADC samples analyzer 210. Further, the wavelet coefficients analyzer 214 analyzes the energy, entropy, and frequency content of the details and/or approximations (wavelet coefficients) to determine if a real defect, as opposed to spurious noise, exists.

Based on the analysis of the content of the details and/or approximations (wavelet coefficients), the wavelet coefficients analyzer 214 identifies the type, location, and duration of the defect. The wavelet coefficients analyzer 214 generates a flag indicating the nature of the defect. The wavelet coefficients analyzer 214 sends the flag to a formatter/controller 216 to map the location, length, and type of defect, for example, in a defect table 218. The in-line wavelet based defect scanning process may be repeated for additional sectors of the media 202 to map the defects in the entirety of the media 202.

Figure 3:
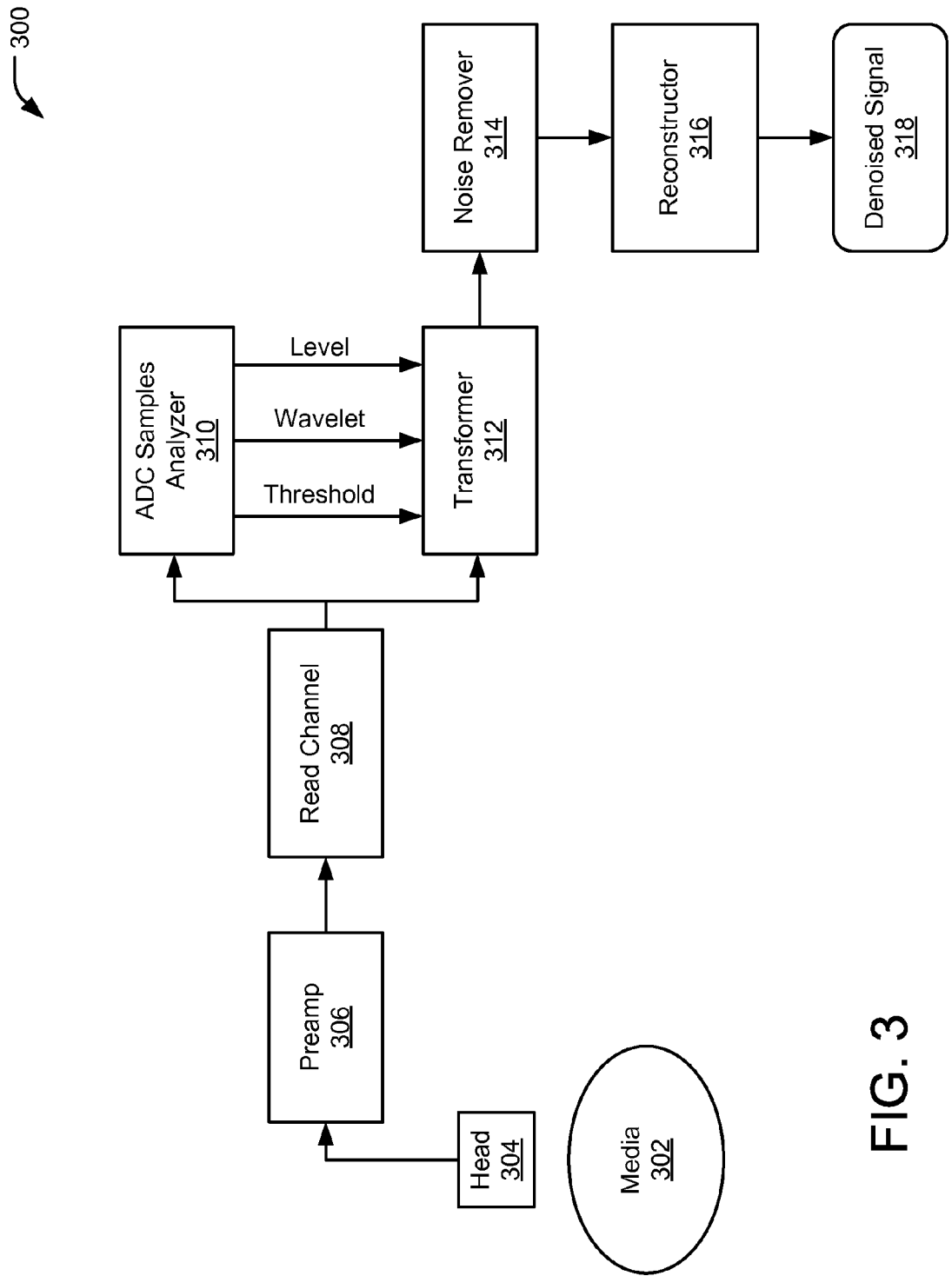
FIG. 3 illustrates an example denoising system providing in-line analysis for wavelet based denoising.

FIG. 3 illustrates an example denoising system 300 providing in-line analysis for wavelet based denoising. The denoising system 300 may be used, for example, to remove any spurious noise that is present in ADC samples or to improve the Signal to Noise Ratio (SNR) of ADC samples. In an implementation, ADC samples are output from a read channel 308. To obtain the ADC samples, a head 304 writes a high frequency repeating pattern on media 302. The head 304 reads the signal from the media 302 generating a readback signal embedded with the high frequency repeating pattern. The readback signal is input into a preamp 306 to amplify the readback signal for analysis. The preamp 306 outputs the amplified readback signal into the read channel 308. The read channel 308 converts the amplified readback signal into the ADC samples.

The ADC samples are input into an ADC samples analyzer 310 and a transformer 312. The ADC samples analyzer 310 passes the ADC samples through each type of wavelet, for example Daubechies, Coiflets, Symlets, Mortlet, etc., and detects the entropy of the ADC samples. Based on the entropy of the ADC samples, the decomposition levels, threshold, and wavelet types required to transform the noisy ADC samples to produce noisy wavelet coefficients. As such, the ADC samples analyzer 310 determines a wavelet type, threshold, and decomposition level that is unique to the ADC samples. The transformer 312 applies a wavelet transform to the ADC samples based on the results of the ADC samples analyzer 310. The wavelet transform of the ADC samples produces wavelet coefficients that are details and/or approximations corresponding to both the desired signal and the noise. A noise remover 314 selects the appropriate threshold limit at each decomposition level and the threshold method, for example hard or soft threshold techniques, to most effectively remove the noise in the details and/or approximations in the wavelet transform domain.

The noise remover 314 outputs denoised details and/or approximations (wavelet coefficients) or thresholded wavelet coefficients. In one implementation, the denoised details and/or approximations (wavelet coefficients) are reconstructed into a denoised signal by a reconstructor 316. The reconstructor 316 applies an inverse wavelet transform on the details and/or approximations (wavelet coefficients) to output denoised ADC samples or signal 318. In another implementation, the denoised details and/or approximations (wavelet coefficients) may be analyzed for defects, for example, though analysis similar to the operations described with regard to FIG. 2.

Figure 4:
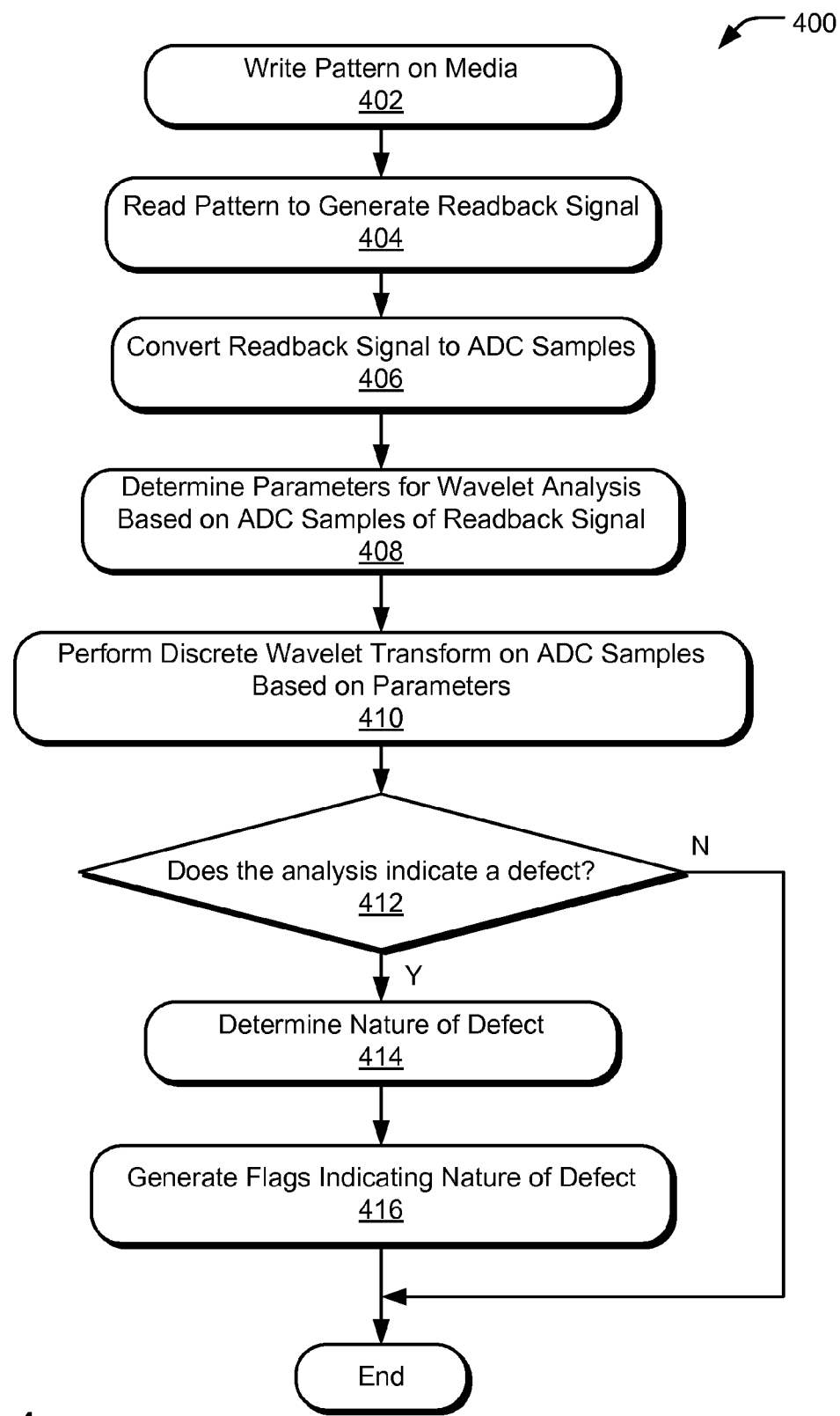
FIG. 4 illustrates example operations for identifying and mapping defects.

FIG. 4 illustrates example operations 400 for mapping defects. In a write operation 402, a high frequency repeating pattern, such as 2T or 4T, is written on media. The high frequency pattern may be written on a test sector or on a test track or on the entire media. In a read operation 404, a particular sector or track in the media is read to generate a readback signal embedded with the high frequency repeating pattern. For example, the written high frequency repeating pattern is read by seeking a read/write head to the test sector or test track in the media.

In a convert operation 406, the readback signal is converted into ADC samples. Prior to being converted, the convert operation 406 may include amplifying the readback signal and/or filtering the readback signal in the analog domain to remove noise from the head and media. A determine operation 408 analyzes the ADC samples of the readback signal to determine parameters for wavelet analysis. The parameters are unique to the characteristics of the readback signal. The determine operation 408 passes the ADC samples through each type of wavelet, for example Daubechies, Coiflets, Symlets, Mortlet, etc., to identify a mother wavelet. Further, the determine operation 408 detects the entropy levels of the ADC samples to determine the parameters for wavelet analysis. Based on the entropy levels of the ADC samples, the determine operation 408 determines the wavelet type, decomposition level, and threshold for wavelet analysis to identify defects.

During a perform operation 410, a wavelet transform, such as a discrete wavelet transform, is applied to the ADC samples converted from the readback signal in the covert operation 406. The perform operation 410 applies a wavelet transform on the ADC samples based on the parameters determined in the determine operation 408. The perform operation 410 decomposes the ADC samples into details and/or approximations (wavelet coefficients) according to the decomposition levels and the wavelet type determined by the determine operation 408. In one implementation, the perform operation 410 includes denoising. To denoise the ADC samples after the wavelet transform is applied, the perform operation 410 selects the appropriate threshold limit at each decomposition level and the threshold method, for example hard or soft threshold techniques, to most effectively remove the noise in the wavelet transform domain. The perform operation 410 outputs denoised details and/or approximations (wavelet coefficients). The details and/or approximations (wavelet coefficients) may be reconstructed to obtain denoised ADC samples or be further analyzed for defects.

An analysis operation 412 determines whether the analysis of the details and/or approximations (wavelet coefficients) obtained from the perform operation 410 indicate the presence of a defect. The details and/or approximations (wavelet coefficients) are analyzed in the analysis operation 410 at a given decomposition level to determine if the waveform of the details and/or approximations (wavelet coefficients) is outside the threshold level determined in the determine operation 408. The analysis operation 412 also analyzes the energy, entropy, and frequency content of the details and/or approximations (wavelet coefficients) to determine if a real defect, as opposed to spurious noise, exists. If the analysis operation 412 indicates the presence of a defect a determination operation 414 analyzes the details and/or approximations (wavelet coefficients) to determine the nature of the defect. In the alternative, if the analysis operation 412 does not indicate the presence of a defect, the operations for mapping defects in the test sector or track are complete. A different sector or track in the media can be tested by resuming the defect scanning operations at the write operation 402 by writing a high frequency pattern on a different sector or track. The operations may continue until the entirety of the media has been scanned for defects and mapped.

The analysis operation 412 determines if there is a defect in the tested sector or track of the media by detecting anomalies in the details and/or approximations (wavelet coefficients). For example, if the details and/or approximations (wavelet coefficients) at a decomposition level show two spikes that are above the threshold predetermined in the determine operation 408, the location corresponding to the samples between the two spikes is defective.

When the written pattern happens to fall on a defective location in the media, the amplitude of the readback signal at that location may drop or increase. An increase in the amplitude indicates a drop-in defect and a decrease in the amplitude indicates a drop-out defect. The drop-in and drop-out defects may be identified by using moving average filters and setting a threshold. However, using moving average filters and thresholds to identify drop-in and drop-out defects may not accurately identify the defects if the defects are too shallow or narrow. Alternatively, drop-in and drop-out defects of any length and amplitude may be detected accurately using the presently disclosed technology. Analysis of the details and/or approximations (wavelet coefficients) at a given decomposition level may show distinct indications in the energy and/or entropy content of the details and/or approximations (wavelet coefficients). These distinct indications in the energy and/or entropy content of the details and/or approximations (wavelet coefficients) accurately identify drop-in and drop-out defects of any length and amplitude.

An erasure defect may be identified by detecting frequency changes in the details and/or approximations (wavelet coefficients) at a given decomposition level. When an erasure defect is present, the frequency changes drastically at the defect location. Erasure defects are typically detected by analyzing reliability information from a Soft Output Viterbi Algorithm (SOVA) detector or by using suitable thresholds. Analyzing the details and/or approximations (wavelet coefficients) at various levels of decomposition eliminates spurious noise that can result in incorrect defect scan decisions.

Based on the analysis of the content of the details and/or approximations (wavelet coefficients), a determine operation 414 identifies the nature of the defect. The determine operation 414 determines the type, location, and duration of the defect. The type is identified by detecting anomalies in the details and/or approximations (wavelet coefficients). As discussed above, anomalies regarding the amplitude of the details and/or approximations (wavelet coefficients) indicate a drop-in or drop-out defect, and anomalies regarding the frequency indicate an erasure defect. The location of the anomaly in the details and/or approximations (wavelet coefficients) corresponds to the location of the defect in the sector of the media. Further, the length that the anomaly spans in the details and/or approximations (wavelet coefficients) corresponds to the duration of the defect in the sector of the media.

A generate operation 416 generates a flag indicating the nature of the defect. The generated flag occupies the same location and spans the same length as that of the identified defect. As such, the defect is mapped to prevent data from being written onto the defective media sector. Additionally, sectors adjacent to defective sectors may be automatically flagged by the generate operation 416 to ensure that the adjacent sectors are not affected by the defect. The operations may be repeated for each sector until the entire media has been scanned for defects by returning to the write operation 402 to write a high frequency pattern on the other sectors.

Figure 5:
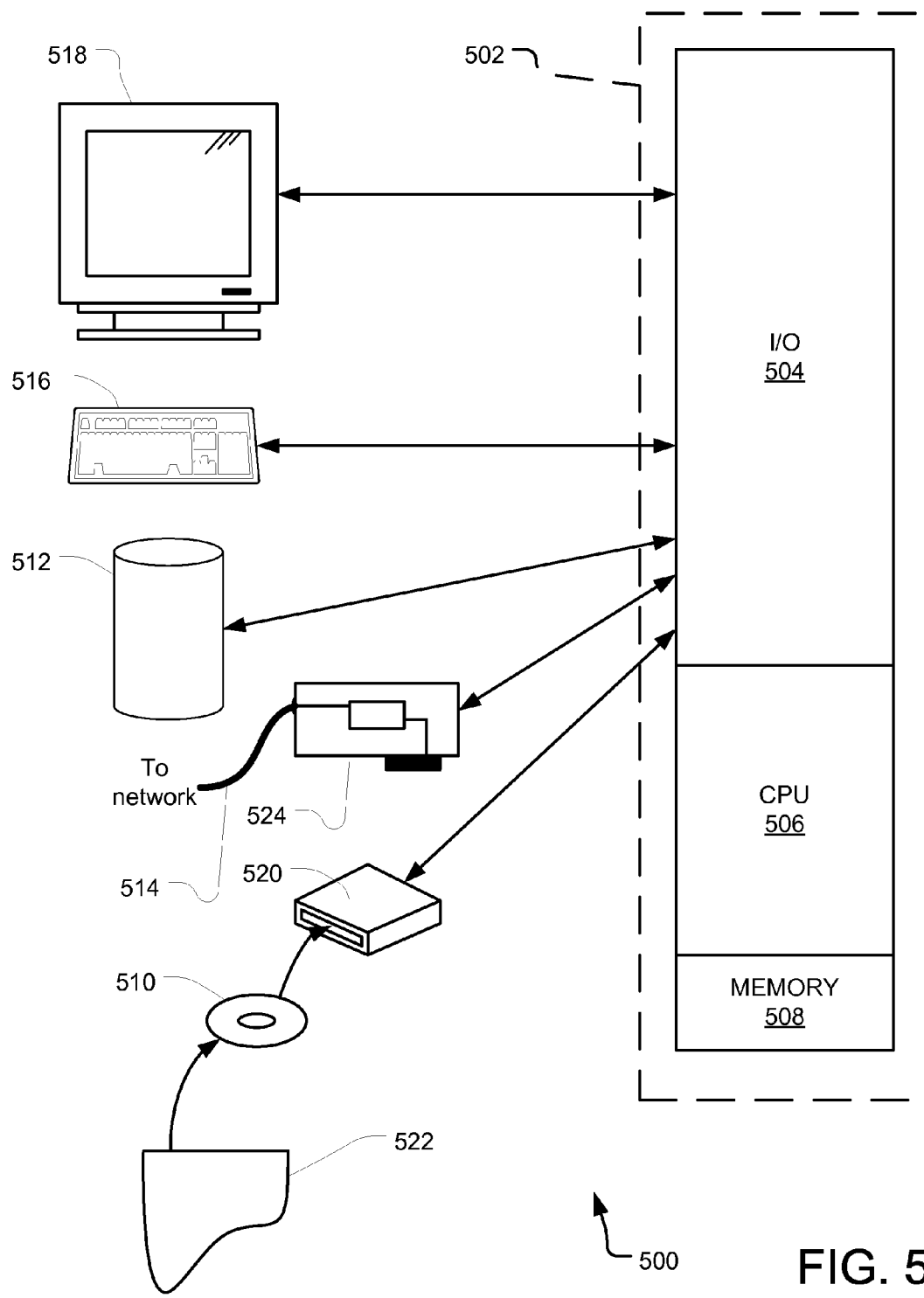
FIG. 5 illustrates an example computing system that may be useful in implementing the presently disclosed technology.

FIG. 5 illustrates an example computing system 500 that may be useful in implementing the presently disclosed technology. A general purpose computer system 500 is capable of executing a computer program product to execute a computer process. Data and program files may be input to the computer system 500, which reads the files and executes the programs therein. Some of the elements of a general purpose computer system 500 are shown in FIG. 5 wherein a processor 502 is shown having an input/output (I/O) section 504, a Central Processing Unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a distributed computer, or any other type of computer. The described technology is optionally implemented in software devices loaded in memory 508, stored on a configured DVD/CD-ROM 510 or storage unit 512, and/or communicated via a wired or wireless network link 514 on a carrier signal, thereby transforming the computer system 500 in FIG. 5 to a special purpose machine for implementing the described operations.

The I/O section 504 is connected to one or more user-interface devices (e.g., a keyboard 516 and a display unit 518), a disc storage unit 512, and a disc drive unit 520. Generally, in contemporary systems, the disc drive unit 520 is a DVD/CD-ROM drive unit capable of reading the DVD/CD-ROM medium 510, which typically contains programs and data 522. Computer program products containing mechanisms to effectuate the systems and methods in accordance with the described technology may reside in the memory section 504, on a disc storage unit 512, or on the DVD/CD-ROM medium 510 of such a system 500. Alternatively, a disc drive unit 520 may be replaced or supplemented by a floppy drive unit, a tape drive unit, or other storage medium drive unit. The network adapter 524 is capable of connecting the computer system 500 to a network via the network link 514, through which the computer system can receive instructions and data embodied in a carrier wave. Examples of such systems include personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, defect detection software and other modules and services may be embodied by instructions stored on the DVD/CD-ROM medium 510, and/or the storage unit 512 and executed by the processor 502. Further, local computing systems, remote data sources and/or services, and other associated logic represent firmware, hardware, and/or software configured to control a read/write head and associated signals. Such services may be implemented using a general purpose computer and specialized software (such as a server executing service software), a special purpose computing system and specialized software (such as a mobile device or network appliance executing service software), or other computing configurations. In addition, program data, such as an algorithm for in-line analysis for wavelet based defect scanning, data read from and written to a storage device, and other data may be stored in the memory 508, the DVD/CD-ROM medium 510, and/or the storage unit 512 and executed by the processor 502.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or a specific order is inherently necessitated by the claim language. Furthermore, one of more portions of the various processes disclosed above with respect to FIG. 4 may be implemented by software, hardware, firmware or combination thereof.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
generating, with an analog to digital converter, one or more analog to digital converter signal samples from a readback signal embedded with a repeating pattern written on a test track in media on a storage device simultaneously in both time and frequency domains;
determining a wavelet type, one or more decomposition levels, and threshold by a samples analyzer based on entropy of the one or more analog to digital converter signal samples;
applying a wavelet transform, with a transformer, to the one or more analog to digital converter signal samples based on the determined wavelet type, one or more decomposition levels, and threshold for each analog to digital converter signal sample;
generating wavelet coefficients, with the transformer, based on the application of the wavelet transform to the one or more analog to digital converter signal samples;
detecting defects in the media with a wavelet coefficients analyzer based on analysis of the wavelet coefficients;
determining if the detected defects in the media are real defects or spurious noise based on analysis of the wavelet coefficients;
determining a type, a location on a sector, and a duration of each defect with a wavelet coefficients analyzer; and
writing data to only non-defective sectors of the media responsive to determining the type, the location on the sector, and the duration of each defect.

2. A method of claim 1, wherein the readback signal is embedded with at least one of a 2T repeating pattern and a 4T repeating pattern.

3. The method of claim 1, further comprising:
generating one or more flags indicating the type, the location on the sector, and the duration of each defect with the wavelet coefficients analyzer.

4. The method of claim 1, further comprising:
determining a threshold method and a threshold limit to remove noise from the wavelet coefficients to obtain denoised coefficients.

5. The method of claim 3, further comprising:
sending the one or more flags to a formatter to map the type, the location, and the duration of each defect in a defect table; and
matching the location of each defect in a memory buffer to prevent data from being recorded in the location in the media where each defect is present.

6. The method of claim 5, further comprising matching defect locations to a memory buffer to prevent data from being recorded in locations in the media where each defect is present.

7. The method of claim 4, further comprising:
analyzing the energy, entropy, and frequency content of the wavelet coefficients to determine if each defect is a real defect or spurious noise.

8. The method of claim 1, wherein the type of each defect is a drop-out defect, a drop-in defect, or an erasure defect.

9. The method of claim 3, further comprising:
determining a sector in the media including a detected defect is a defective sector; and
generating one or more flags for sectors that are adjacent to the defective sector.

10. The method of claim 9, further comprising:
disqualifying defective sectors and sectors that are adjacent to defective sectors in the media for high frequency pattern writing operations.

11. A device comprising:
an analog to digital converter configured to generate one or more analog to digital converter signal samples from a readback signal simultaneously in both time and frequency domains, wherein the readback signal is embedded with a repeating pattern written on a test track in media on a storage device;
a samples analyzer configured to receive one or more analog to digital converter signal samples, wherein the samples analyzer determines a wavelet type, one or more decomposition levels, and a threshold based on entropy of the one or more analog to digital converter signal samples;
a transformer configured to receive the one or more analog to digital converter signal samples, wherein the transformer is coupled to the samples analyzer, and the transformer applies a wavelet transform to the one or more analog to digital converter signal samples based on the wavelet type, one or more decomposition levels, and the threshold received from the samples analyzer to obtain wavelet coefficients; and a wavelet coefficients analyzer configured to detect defects in the media based on analysis of the wavelet coefficients and determine if the detected defects in the media are real defects or spurious noise based on analysis of the wavelet coefficients and determine a type, a location, and a duration of each defect; and a read channel to control a head to write data to only non-defective sectors of the media responsive to determining the type, the location on the sector, and the duration of each defect.

12. The device of claim 11, wherein the readback signal is embedded with at least one of a 2T repeating pattern and a 4T repeating pattern.

13. The device of claim 11, wherein the wavelet coefficients analyzer is configured to generate one or more flags indicating the type, the location, and the duration of each defect.

14. The device of claim 11, wherein the transformer is coupled to a noise remover, wherein the noise remover receives the wavelet coefficients from the transformer and determines a threshold method and a threshold limit to remove noise from the wavelet coefficients to output denoised coefficients.

15. The device of claim 14, wherein the noise remover is coupled to a reconstructor, wherein the reconstructor receives the denoised coefficients from the noise remover and applies an inverse wavelet transform on the denoised coefficients to output a denoised signal.

16. The device of claim 13, further comprising:
a defect table configured to map the type, the location, and the duration of each defect from the one or more flags and match the location of each defect in a memory buffer to prevent data from being recorded in the location in the media where each defect is present.

17. One or more non-transitory computer-readable storage media encoding a processor executable program for executing on a computer system a computer process, the computer process comprising:

generating, with an analog to digital converter, one or more analog to digital converter signal samples from a readback signal embedded with a repeating pattern written on a test track in media on a storage device simultaneously in both time and frequency domains;

determining a wavelet type, one or more decomposition levels, and threshold by a samples analyzer based on entropy of the one or more analog to digital converter signal samples;

applying a wavelet transform, with a transformer, to the one or more analog to digital converter signal samples based on the determined wavelet type, one or more decomposition levels, and threshold for each analog to digital converter signal sample;

generating wavelet coefficients, with the transformer, based on the application of the wavelet transform to the one or more analog to digital converter signal samples;

detecting defects in the media with a wavelet coefficients analyzer based on analysis of the wavelet coefficients;

determining if the detected defects in the media are real defects or spurious noise and determining a type, a location, and a duration of each defect based on analysis of the wavelet coefficients; and writing data to only non-defective sectors of the media responsive to determining the type, the location on the sector, and the duration of each defect.

18. The one or more non-transitory computer-readable storage media of claim 17, wherein the readback signal is embedded with at least one of a 2T repeating pattern and a 4T repeating pattern.

19. The one or more non-transitory computer-readable storage media of claim 17 wherein the computer process further comprises:

generating one or more flags indicating the type, the location, and the duration of each defect.

20. The one or more non-transitory computer-readable storage media of claim 17, wherein the type, location, and duration of each defect is determined based on one or more of an energy content, an entropy content, and a frequency content of the wavelet coefficients.

* * * * *